(12) United States Patent
Peich

(10) Patent No.: US 6,250,252 B1
(45) Date of Patent: Jun. 26, 2001

(54) AUTOMATED LIVESTOCK FEEDING APPARATUS

(76) Inventor: Leland M. Peich, 3517 S. Carvers Rock Rd., Avalon, WI (US) 53505

(*) Notice: Subject to any disclaimer, the term of this patent is extended or adjusted under 35 U.S.C. 154(b) by 0 days.

(21) Appl. No.: 09/312,528

(22) Filed: May 14, 1999

Related U.S. Application Data

(60) Provisional application No. 60/100,534, filed on Sep. 16, 1998, and provisional application No. 60/085,641, filed on May 15, 1998.

(51) Int. Cl.[7] ..................................................... A01K 5/00
(52) U.S. Cl. .......................................................... 119/51.11
(58) Field of Search ............................. 119/51.04, 51.11, 119/51.13, 57.1, 57.4, 57.5, 57.7

(56) References Cited

U.S. PATENT DOCUMENTS

| | | | |
|---|---|---|---|
| 3,598,087 | * 8/1971 | Ramser | 119/51.11 |
| 4,665,862 | * 5/1987 | Pitchford, Jr. | 119/51.11 |
| 5,363,805 | * 11/1994 | Wing | 119/51.11 |
| 5,927,232 | * 7/1999 | Pollock | 119/57.4 |
| 6,082,299 | * 7/2000 | Halford | 119/51.04 |

* cited by examiner

Primary Examiner—Charles T. Jordan
Assistant Examiner—Elizabeth Shaw
(74) Attorney, Agent, or Firm—Andrus, Sceales, Starke & Sawall, LLP

(57) ABSTRACT

An automated livestock feeding system includes a bulk feed tank, a conveyor for supplying feed to feeding troughs located within a livestock building, a control unit for controlling the supply of feed to the feeding troughs, and a timer electrically connected to the control unit. The timer terminates the supply of feed to the feeding troughs if the control unit fails to stop the supply of feed to the feeding troughs after a predetermined time period. The timer automatically resets if the supply of feed to the feeding troughs is terminated prior to the end of the predetermined time period.

19 Claims, 6 Drawing Sheets

AUTOMATED LIVESTOCK FEEDING APPARATUS

CROSS REFERENCE TO RELATED APPLICATION

This application is based on the claims priority from U.S. provisional patent application Ser. No. 60/085,641 filed on May 15, 1998 and also claim the benefit of U.S. provisional application No. 60/100,534, filed Sep. 16, 1998.

BACKGROUND OF THE INVENTION

The invention relates to automated livestock feeding systems, and more particularly to an automated livestock feeding system having a timer for terminating operation of the feeding system after a set predetermined time in the event of a system failure.

In commercial livestock operations, it is conventional to raise several hundred animals in livestock houses. These livestock houses may be 40 to 60 feet wide and several hundred feet long. An automated feeding system is provided to feed the animals and typically includes one or more bulk feed tanks located outside of the livestock house. Feed trucks deliver feed to these bulk feed tanks. A conveyor conveys the feed from the bulk feed tanks into the livestock house. A multiplicity of feeding bins or troughs are located within the livestock house and are automatically supplied feed from the conveyor. The conveyor is typically a closed tube in which a helical auger is housed. The auger may either be rotary driven to convey the feed axially through the tube; or axially driven to transport the feed through the tube. The feed system also includes drop tubes associated with openings in the conveyor. Each drop tube extends downwardly from an opening in the conveyor tube so that feed is supplied along the conveyor tube to the drop tubes into a plurality of feeding bins or troughs in line with the conveyor tube. Operation of the conveyor functions to successively fill the drop tubes and feeding troughs along the length of the system.

Feeding systems of this type are typically controlled such that after all the feeding troughs in the line are filled with feed, the conveyor is turned off. This is either accomplished by operating the feed line for a predetermined time calculated to fill all of the feeders, or by a sensor switch, operated by a paddle engageable by the feed, which is provided in the last feeder of the feeder line to sense when the last feeder is filled with feed and to shut off the conveyor.

Equipment manufacturers have utilized a switch in the last feeding trough of the feed line to sense when the last feeding trough is provided with a predetermined amount of feed. The paddle switch is responsive to the amount of feed within the feeding trough such that upon delivery of feed exceeding some predetermined value, the sensor generates a signal to turn off the conveyor drive motor and thus prevent continued operation of the conveyor. As is typical, such prior art switches employ a pivotally mounted paddle disposed generally vertically and exposed to the feed delivered to the feeding trough within which the feed level is to be controlled. As feed is delivered to the feeding trough from the conveyor tube and drop tube, the feed puts pressure against the paddle causing the paddle to rotate. This rotational movement actuates a proximity switch in response to a predetermined amount of movement of the paddle which causes a signal to be generated which corresponds to a desired amount of feed being delivered to the feeding trough. The signal is then used to turn off power to the conveyor drive motor.

There have been certain shortcomings of such prior art units. For example, it has been found that such paddle switch control units are not sufficiently sensitive to a quantity of feed in the feeding trough to effect pivoting of the paddle so as to generate the control signal in response to some quantity of feed being deposited in the feeding trough. Further, as the composition (i.e. density and flowability) of the feed is changed, the paddle sensor may not be moved through a sufficient distance so as to actuate the switch to generate the control signal. It is also possible for a drop tube to become disengaged from the conveyor tube, which results in feed being discharged from the conveyor tube opening. Malfunctions of this type cause the feed conveyor to run continuously since feed does not reach the end trough, thereby spilling and wasting feed, and causing excessive wear and tear on the conveyor feeding system.

BRIEF SUMMARY OF THE INVENTION

The invention provides an automatic livestock feeding system including a timer that shuts down the feeding system after a set period of time, and automatically resets itself if the pressure sensor stops the feeding cycle prior to the end of the timer cycle. More particularly, the timer prevents the automated livestock feeding system from running continuously in the event of a system failure or if the system runs out of feed. The timer allows the feeding system to run only for a preset period of time, then the timer shuts the entire system down until the system and the timer are manually reset. This prevents waste of feed and excessive wear and tear on the feeding system caused by continuous operation of the system in the event of a malfunction.

It is an advantage of the invention to provide an automatic livestock feeding system having a timer that eliminates feed waste and extensive running of the system in the event of a system failure, and that resets itself in the event that there is no failure of the system.

Various other features, objects and advantages of the invention will be made apparent from the following detailed description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
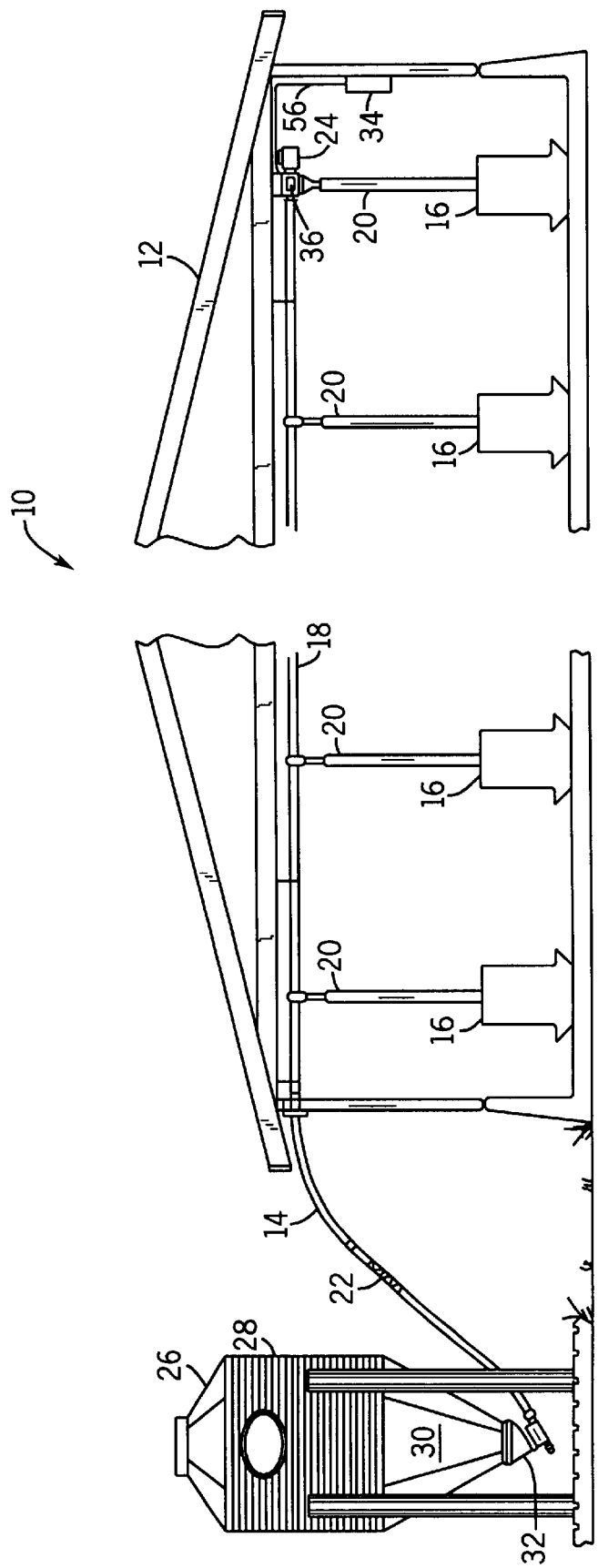
FIG. 1 is a side elevational view of a livestock building having a feeder system for conveying feed from a bulk feed tank located outside of the building, and incorporating a timer control in accordance with the invention.

FIG. 1 generally shows a livestock building having a feed conveyor for conveying feed from a bulk feed tank to a multiplicity of feeders disposed in a line or a plurality of lines within the livestock building. A livestock feeding system is indicated generally as reference numeral 10. The livestock feeding system 10 supplies feed to livestock housed within a livestock building 12. The livestock building 12 may, for example, be about 40 to 60 feet wide and hundreds of feet long and contain hundreds of animals. The feeding system 10 comprises a feed conveyor 14 having a multiplicity of individual feeders or feeding troughs 16 positioned at spaced intervals along the feed conveyor line. The feed conveyor 14 comprises a conveyor tube 18 having a plurality of outlet openings therein for attaching drop tubes 20 thereto for supplying feed to the individual feeders 16.

The feed conveyor 14 has an auger 22 disposed within the conveyor tube 18. Generally, auger 22 is an open helical coil-like member having flights based at equal intervals therealong. The auger is preferably a flexible centerless auger so as to enable it to readily go around corners and accommodate changes in elevation. The auger may also comprise a similar construction such as a belted conveyor or paddles on a chain for moving feed through a tube. The feed conveyor system 10 further comprises a drive motor 24 for axially driving auger 22 within the length of the feed conveyor tube 18. The drive motor 24 is preferably an electric motor located at the end of the conveyor line.

A bulk feed tank 26 is shown located outside the livestock building 12. The bulk feed tank 26 has a raised tank body 28 with a downwardly converging outlet section 30. At the bottom end of the outlet section 30 is an outlet boot 32 which is connected to the feed conveyor 14.

A feed level control sensor (not shown) is provided in the last feeding trough 16 to control operation of the feed conveyor 14. The feed level control sensor terminates operation of the feed conveyor 14 when the feed level within the last feeding trough 16 is at or above a specified feed level indicative of a desired quantity of feed within the feeding trough.

The feed level control sensor comprises a bracket which is adapted to be secured to the side wall of the last feeding trough 16. The sensor is mounted for vertical adjustment on the bracket, so as to be adjustably mounted in a vertical direction to accommodate a range of desired feed levels within the feeding trough. The sensor includes a microswitch which has a pivotally mounted switch arm carrying a feed paddle. The feed paddle is oriented in a substantially vertical position so that as the feed level rises within the feeding trough, feed contacts the paddle. The weight of the feed pushes against the paddle and trips the micro-switch initiating a signal which is used to terminate operation of drive motor 24, and thereby feed conveyor 14. The vertical position of the switch and paddle are located in the feeding trough so as to establish a desired feed level within the feeding trough. The general components and operation of feeding system 10 described above are known in the art, and may illustratively be that such as is available from Chore-Time under the Model Nos. 55, 75, 90 & HMC Flex-Auger Feed Delivery Systems.

In accordance with the invention, the feeding system 10 is provided with a timer 34 for stopping operation of the feed conveyor 14 after a set predetermined time has elapsed. A control unit 36 is mounted at the end of the feed conveyor in line with the drive motor 24. The control unit 36 controls operation of the drive motor 24 and the feed level control sensor. The control unit 36 is also electrically connected to the timer 34 mounted on the far end wall opposite the bulk feed tank 26. The timer 34 is set to a predetermined time for which the feed conveyor 14 will continue to run. After the predetermined time has elapsed, the timer 34 sends a signal to the control unit 36 to terminate operation of the feed conveyor 14. The feed conveyor 14 also terminates in response to a signal generated by the sensor located in the last feeding trough 16 at the end of the feed conveyor path, as described above.

Figure 2A:
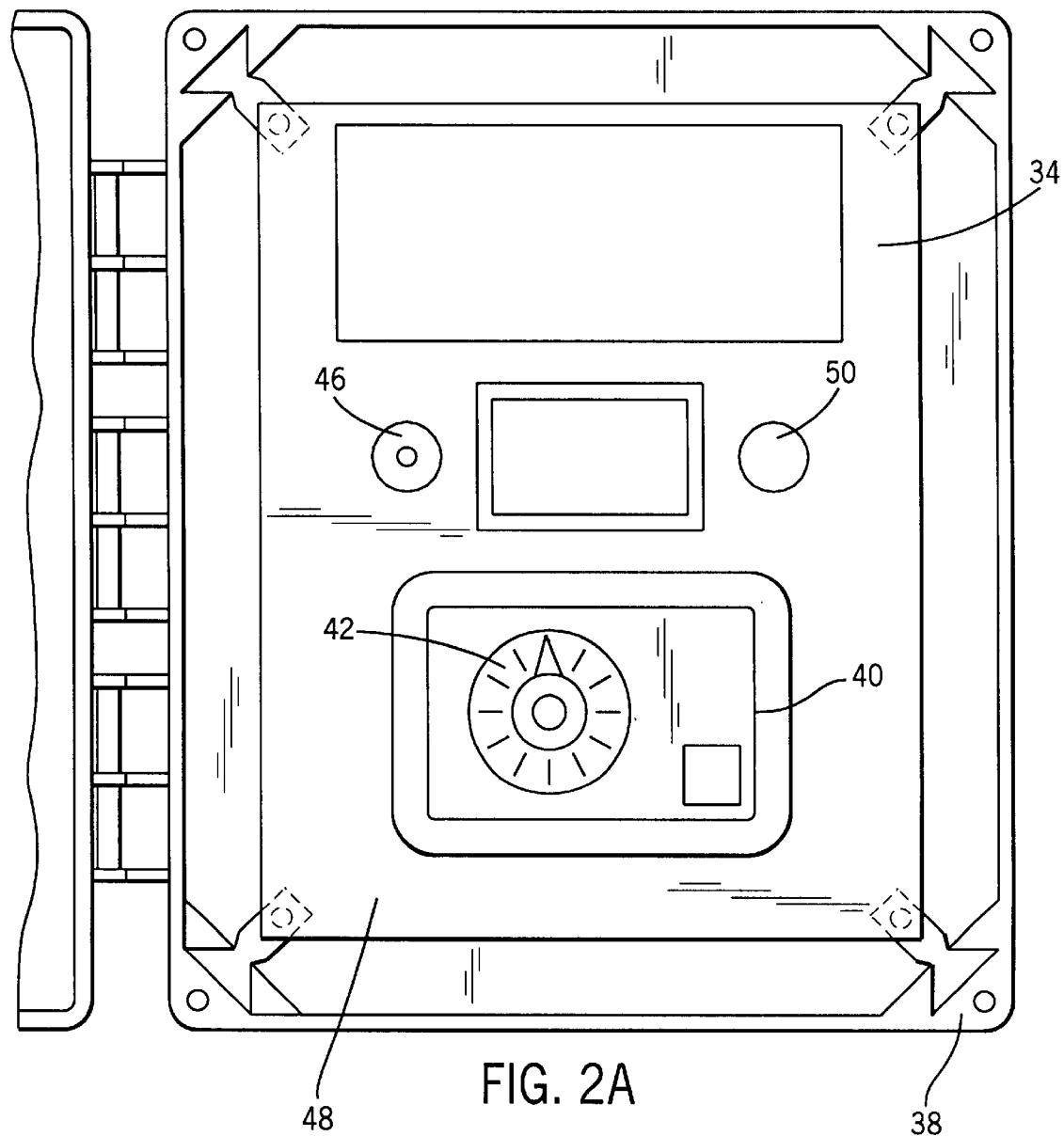
FIG. 2A is a top plan view of a single timer control for use in controlling one side of a livestock feeding system as in FIG. 1.
Figure 2B:
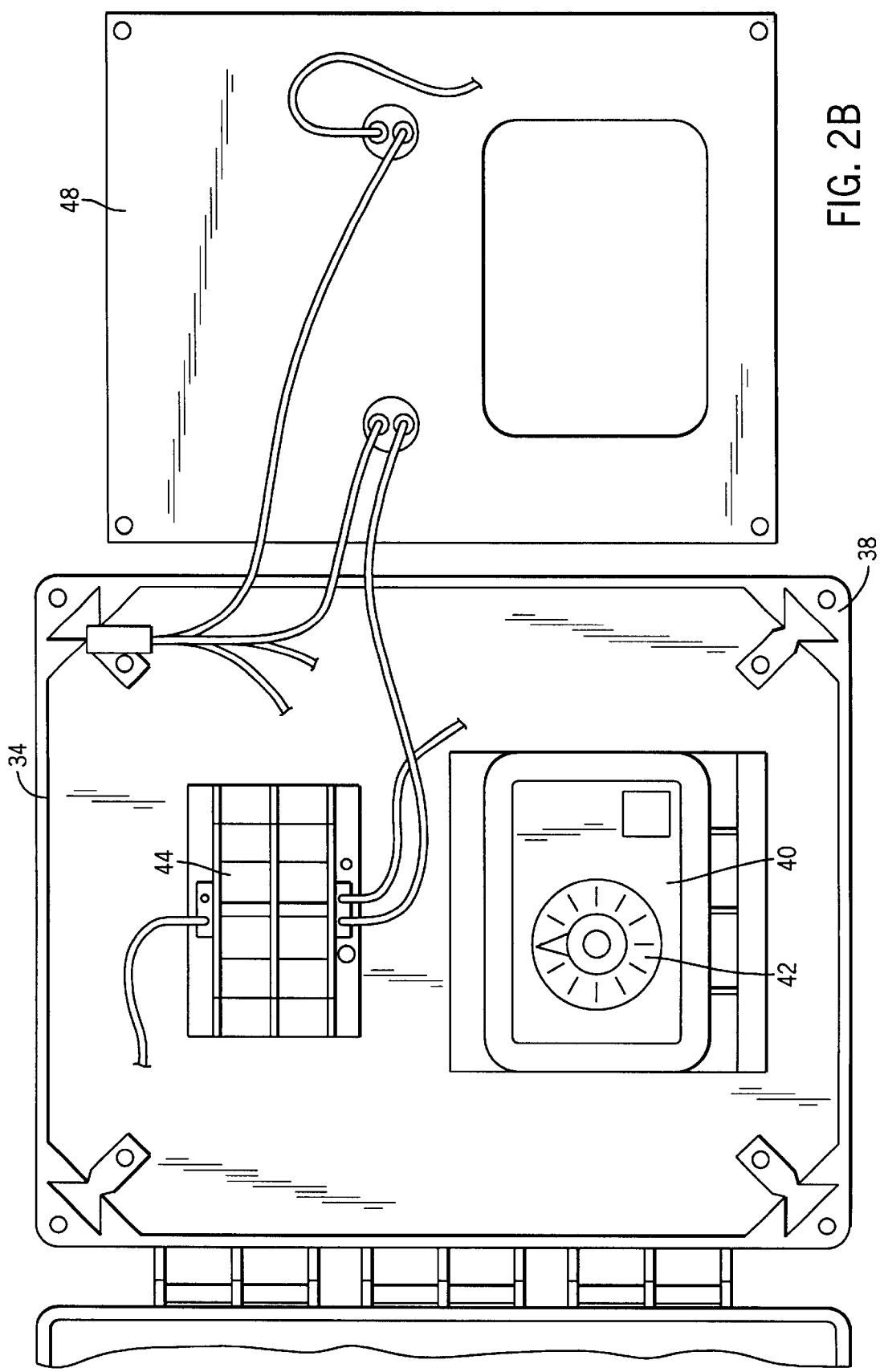
FIG. 2B is a top plan view of the internal components of the timer control of FIG. 2A.

FIGS. 2A and 2B show a top plan view of timer 34 which is used in connection with the livestock feeding system of the present invention. The components of the timer 34 are housed within an enclosure 38 which is mountable to an end wall of building 12 in close proximity to control unit 36. The timer 34 is comprised of a manually settable automatic reset control timer 40, preferably made by Paragon Electric Company, Inc., Part No. 501-132-00. Control timer 40 has a manually settable dial 42 for setting a predetermined time from which the timer will count down. The dial 42 has markings on it for setting the time between 0 and 60 minutes in one minute increments. Once the dial 42 is set to a predetermined time, the control timer 40 will count down from the predetermined time to zero at which point the control timer 40 sends a signal to a definite purpose contactor switch 44 contained within the enclosure 38 and onto the control unit 36 for terminating operation of the feed conveyor 14. The definite purpose contactor switch 44 is a Square D or comparable definite purpose series A contactor, having an open type two pole 120 volt configuration. The timer 34 also includes a pushbutton switch attached to a panel 48 within the enclosure 38 for manually resetting the timer. The pushbutton switch is a conventional single phase normally closed pushbutton switch such as a switch manufactured by GB Electric, Inc., Part No. GSW-23. An indicator light 50 is mounted on the panel 48 and is used to indicate the feed system is delivering feed to the feeder or the timer has terminated operation of the feed system. The indicator light is a typical 120 volt indicator light such as that manufactured by Square D, Part No. 9001-OR120.

Figure 3A:
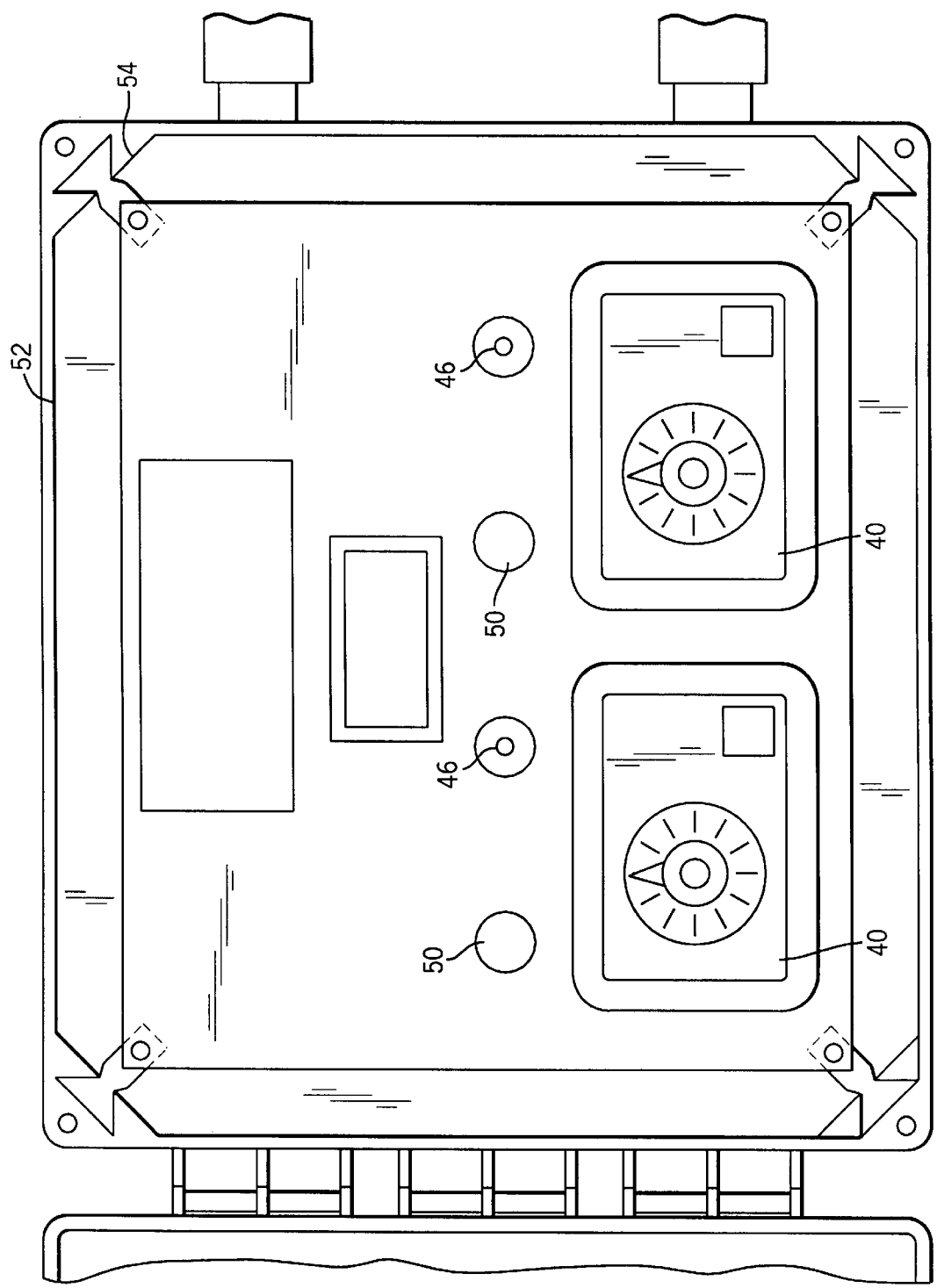
FIG. 3A is a top plan view of a dual timer control for use in controlling operation of a two-sided livestock feeding systems as in FIG. 1.
Figure 3B:
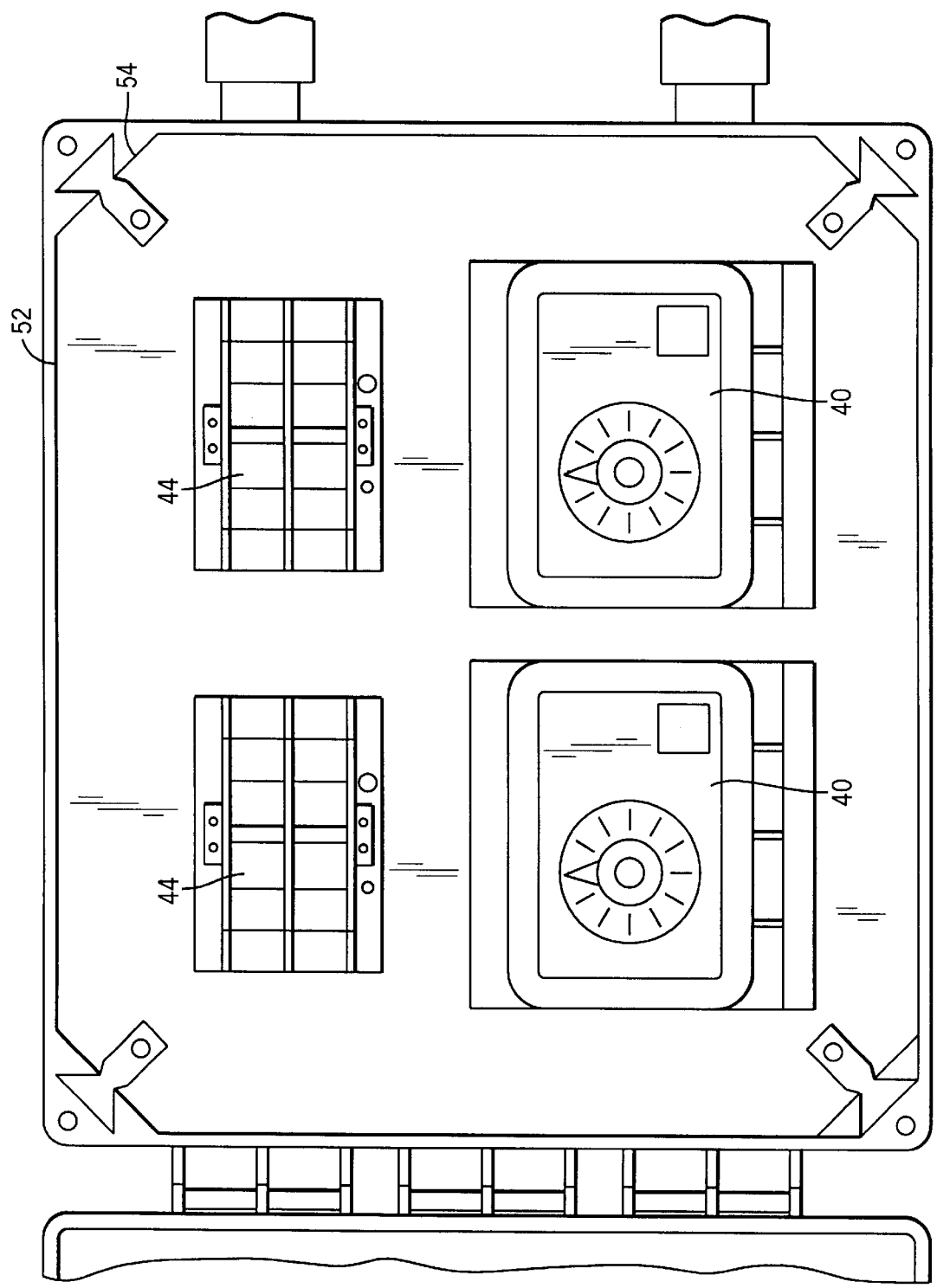
FIG. 3B is a top plan view of the internal components of the dual timer control of FIG. 3A.

FIGS. 3A and 3B show a dual timer 52 which may be used in connection with a two-sided livestock feeding system. The dual timer 52 utilizes the same components as single timer 34, except there are two manually settable automatic reset control timers 40, two double pole definite purpose contactor switches 44, two indicator lights 50, and two pushbutton reset switches 46. The dual timer 52 is also housed within an enclosure 54 that is mountable to an end wall of the livestock building 12 in close proximity to the control unit 36. The timers 34 and 52 are only operable when electrically connected to the control unit 36 as shown by the line 56 in FIG. 1.

Figure 4:
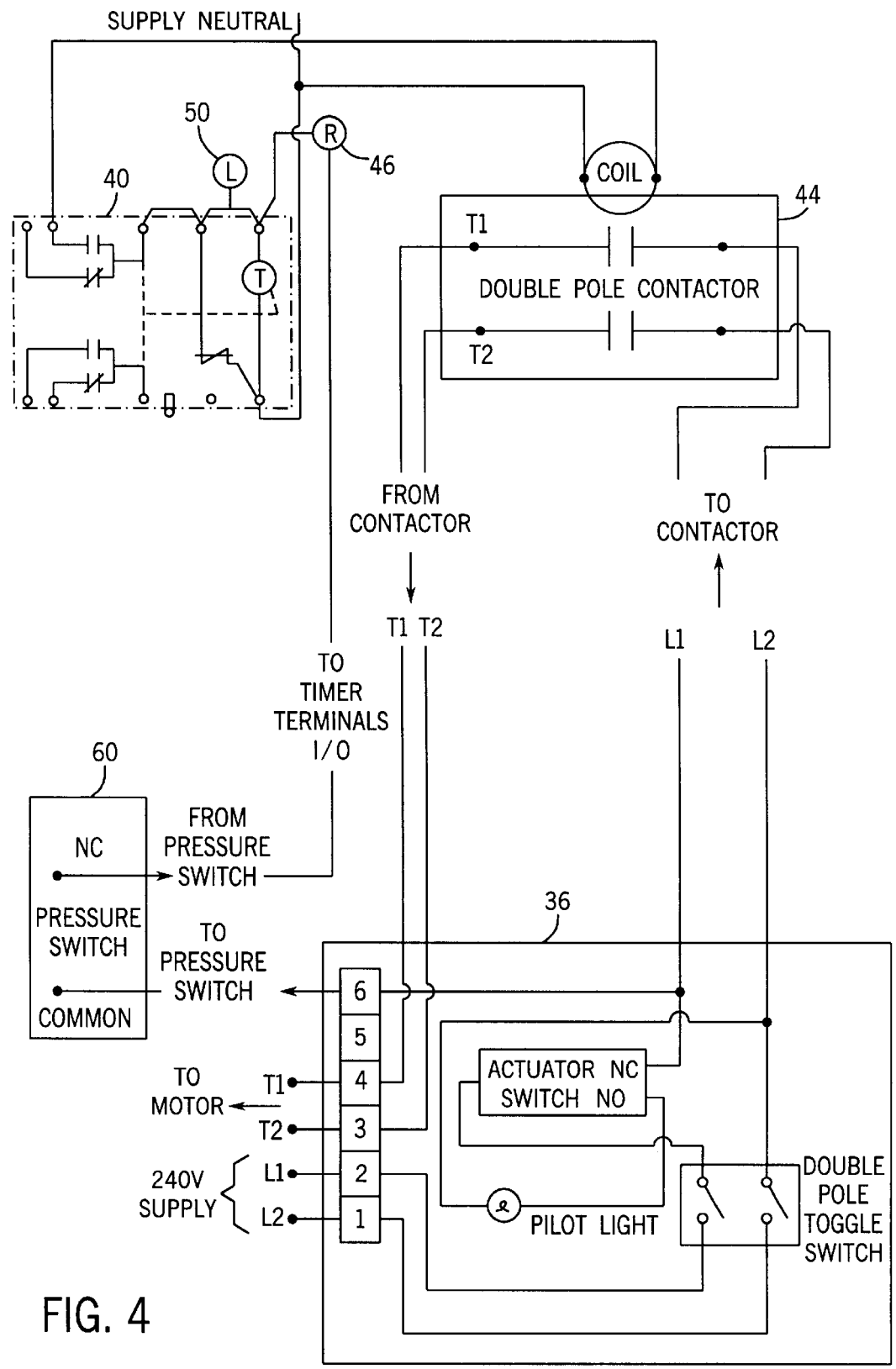
FIG. 4 is a schematic diagram of the timer control of the invention as interconnected with the feeding system control unit.

FIG. 4 illustrates a wiring diagram of the automated livestock feeding system of the present invention. Under normal operating conditions, the feeding system starts when a pressure switch, shown at 60, installed in the last feeding trough 16 senses the absence of feed within the trough 16 and initiates delivery of feed by sending a signal to the control unit 36. When feed delivery is initiated, the timer 40 starts counting down from a preset time, which is settable on the dial 42 from one to sixty minutes in one minute increments. If the feeding troughs are all filled within the set period of time, then the pressure switch 60 will terminate the feed conveyor. At that time, the timer 34 automatically resets to the initial preset period of time.

If there is a malfunction in any part of the feeding system, the timer 34 terminates the feed conveyor at the end of the preset time and thereby minimizing the amount of feed wasted. If the timer 34 terminates the feeding system, the timer 34 must be manually reset by pushing pushbutton 46.

It is recognized that other equivalents, alternatives, and modifications aside from those expressly stated, are possible and within the scope of the appended claims.

I claim:

1. A feed conveyor for supplying feed to a plurality of feeding troughs located in a livestock building;
   a control unit for controlling the operation of the feed conveyor to control the supply of feed to the feeding troughs, the control unit including a sensor for detecting the amount of feed in the feeding troughs, wherein the control unit terminates the supply of feed to the feeding troughs when a predetermined amount of feed is in the feeding troughs and operates the feed conveyor to supply feed to the feeding troughs when the amount of feed in the feed troughs is below the predetermined amount; and
   a timer connected to the control unit and operable to define a predetermined time period that begins when the control unit begins operation of the feed conveyor, wherein the timer terminates the supply of feed to the feeding troughs when the feed conveyor continuously supplies feed to the troughs for longer than the predetermined time period, wherein the timer is automatically reset when the supply of feed to the feeding troughs is terminated by control unit upon detection of the predetermined amount of feed in the feed troughs.

2. The feeding system of claim 1 wherein the timer is electrically connected to the control unit and includes a manually settable dial.

3. The feeding system of claim 2 wherein the manually settable dial includes time settings between zero and sixty minutes in increments of one minute whereby the timer may be set in individual minute increments up to sixty minutes.

4. The feeding system of claim 1 wherein the feed conveyor includes an auger disposed within a conveyor tube for conveying feed along the length of the feed conveyor.

5. The feeding system of claim 4 wherein the auger is driven by a drive motor.

6. The feeding system of claim 1 wherein the timer is wall mounted in close proximity to the control unit for electrical connection between the timer and the control unit.

7. The feeding system of claim 1 wherein the timer includes an indicator light that illuminates when the feeding system is delivering feed to the feeding troughs or the timer has terminated the feed conveyor due to a system malfunction.

8. The feeding system of claim 1 wherein the timer includes a reset button for manually resetting the timer.

9. The feeding system of claim 1 wherein the sensor is located in an end feeding trough at the end of the feed conveyor.

10. The feeding system of claim 1 wherein the control unit terminates the supply of feed to said feeding troughs when a predetermined amount of feed is in said end feeding trough.

11. In a livestock feeding system in which livestock are supplied with feed from one or more trough feeders, said feeding system comprising a feed conveyor for conveying the feed to the trough feeders, said feed conveyor comprising a conveyor tube extending along a feed line conveyor path to said trough feeders, a plurality of feed supply members extending from said feed conveyor and into said trough feeders, a control unit for controlling operation of said feed conveyor, said control unit being responsive to a sensor for detecting the amount of feed in said trough feeders, the improvement comprising a timer operable to define a predetermined time period that begins after the start of operation of the feed conveyor, the timer being operable to terminate the supply of feed to said trough feeders when the control unit continuously supplies feed to said trough feeders for longer than the predetermined time period, wherein the timer automatically resets if the supply of feed to said trough feeders is terminated by the sensor prior to the end of said predetermined time period.

12. The improvement of claim 11 wherein the predetermined time period of the timer is manually set by a dial.

13. The improvement of claim 12 wherein the dial includes settings and markings in one minute increments from zero to sixty minutes.

14. The improvement of claim 11 wherein the timer is mountable to an end wall of a livestock building in close proximity to the control unit for electrical connection of the timer to the control unit.

15. The improvement of claim 11 wherein the timer includes an indicator light to indicate that the timer is counting down from a preset time.

16. A method of operating a livestock feeding system in which livestock are supplied with feed from one or more trough feeders, wherein the trough feeders are supplied with feed from a feed conveyor, the method comprising the steps of:
   sensing the amount of feed in the feeding troughs;
   operating the feed conveyor to supply feed to the feeding troughs when the sensed amount of feed in the feeding toughs is below a predetermined amount;
   activating a timer upon operation of the feed conveyor, the timer being configured to define a predetermined time period;
   terminating the operation of the feed conveyor upon either the expiration of the predetermined time period or when the sensed amount of feed in the feeding troughs is above the predetermined amount; and
   resetting the timer when the operation of the feed conveyor is terminated prior to the expiration of the predetermined time period by the sensing of feed above the predetermined amount.

17. The method of claim 17 further comprising the step of manually setting the duration of the predetermined time period.

18. The method of claim 17 wherein the duration of the predetermined time period is manually set by a dial.

19. The method of claim 16 further comprising the step of providing a reset button operable to manually reset the timer.

* * * * *

UNITED STATES PATENT AND TRADEMARK OFFICE
CERTIFICATE OF CORRECTION

PATENT NO.    : 6,250,252 B1
DATED         : June 26, 2001
INVENTOR(S)   : Leland M. Peich It is certified that error appears in the above-identified patent and that said Letters Patent is hereby corrected as shown below:

<u>Column 5,</u>
Line 5, delete "A" and substitute therefor -- An automatic livestock feeding system comprising: a --

<u>Column 6,</u>
Line 50, delete "17" and substitute therefore -- 16 --.

Signed and Sealed this

Twenty-sixth Day of November, 2002

Attest:

Attesting Officer

JAMES E. ROGAN
*Director of the United States Patent and Trademark Office*